Patented July 15, 1952

2,603,641

UNITED STATES PATENT OFFICE 2,603,641

SULFONAMIDE CHOLINE COMPOUNDS AND PROCESS

Walter C. Gakenheimer, Westfield, N. J., assignor to Merck & Co., Inc., Rahway, N. J., a corporation of New Jersey No Drawing. Application September 3, 1949, Serial No. 114,063

9 Claims. (Cl. 260—239.65)

This invention relates to new pharmaceutical products and to methods by which they may be prepared. More particularly it relates to new water soluble reaction products of choline and sulfonamides such as sulfathiazole, sulfaquinoxaline, sulfapyridine and the like, useful in the preparation of medicinal products in the form of water soluble tablets, solutions and the like.

Therapeutically useful sulfonamides (also known as sulfa drugs) such as sulfaquinoxaline and the like are frequently administered in the form of their alkali metal salts. Sodium sulfaquinoxaline, for example, is utilized in poultry medication preferably dissolved in drinking water. However, the administration of alkali metal salts of sulfaquinoxaline presents serious disadvantages. The presence of an alkali metal in these preparations produces a high pH and adds materially to the toxicity of the preparation.

It has been proposed to prepare reaction products of sulfonamides and choline by reacting choline derivatives with sulfanilamide. The Swiss Patent No. 198,137 (C. A. 33, 3530; Ch. Z. 1939 I 4650) discloses the preparation of p-sulfamido phenyl carbamic acid choline chloride by reacting sulfanilamide with the chloroformic acid ester of choline chloride. This reaction may be represented as follows:

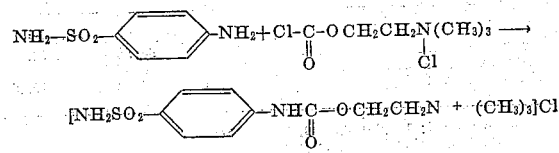

These derivatives of sulfonamides described in the prior art are prepared by reacting the basic amino group of sulfonamides and may be considered as esters of sulfonamides.

I have now found that I can prepare new and useful compounds of sulfonamides by reacting the acidic group of sulfonamides, i. e. —SO₂NHR wherein R stands for hydrogen or a heterocyclic group, with choline, a compound widely distributed in nature and having the formula:

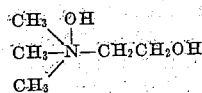

I have found that choline reacts readily with sulfonamides to form water soluble reaction products. These new products possess very low toxicity and are capable of producing weakly alkaline solutions having a pH within the range of about 8 to 10. Because of their low toxicity and their ability to form solutions having a weak alkaline reaction, the new compounds, prepared in accordance with my invention, are particularly suitable for the preparation of therapeutically useful aqueous solutions or water soluble tablets of sulfonamides such as sulfapyridine, sulfathiazole, sulfaquinoxaline, and the like.

In carrying out my invention in a preferred manner a sulfonamide is reacted with choline in an aqueous medium. The sulfonamide is dissolved in an aqueous solution of choline, the reactants being present preferably in equimolar proportion. While I have obtained excellent results by carrying out this reaction in an aqueous medium, other solvents can be used. Suitable solvents are, for example, alcohol or acetone. The reaction of choline with sulfonamides proceeds quickly and smoothly and may be carried out at room temperature.

The reaction product of choline and sulfonamide which can be regarded as a choline salt of sulfonamide, can be isolated from the reaction mixture in a crystalline form.

The isolation of the reaction product in high yields and in a purified form can be accomplished by adding a water immiscible organic solvent such as benzene to the reaction mixture. The organic solvent is added for the purpose of producing an azeotropic mixture which facilitates the complete removal of water. The solvents, i. e. benzene and water are then distilled off under vacuum leaving a glassy hygroscopic solid, which may be converted to a non-hygroscopic crystalline compound by treatment with an aliphatic alcohol such as ethanol and recrystallization from the same solvent. This method is particularly suitable for the isolation of sulfaquinoxaline choline.

The recovery of choline salts of sulfonamides such as sulfapyridine choline, sulfathiazole choline and the like, may be accomplished by the use of a simplified procedure which does not require the removal of solvents by distillation. An aliphatic alcohol such as ethanol is added to the reaction mixture produced by dissolving a sulfonamide in an aqueous solution of choline, and the desired choline salt can then be precipitated by the addition of an organic liquid such as ether.

The sulfonamides particularly suitable for the formation of choline salts are those having an acidic group —SO₂NHR wherein R represents hydrogen or a heterocyclic group, as for example:

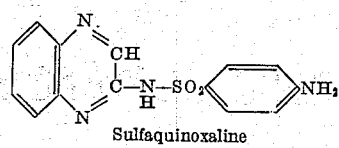
Sulfaquinoxaline

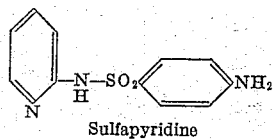
Sulfapyridine

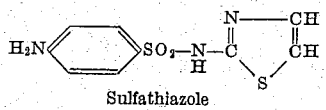
Sulfathiazole

The reaction products of choline and sulfonamides prepared in accordance with this invention possess the characteristics of a salt and their behavior as normal 1:1 electrolytes has been determined by electrometric conductivity measurements.

The structural formulae of these reaction products may be represented as follows:

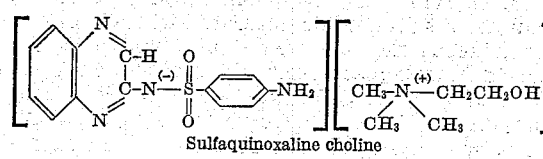
Sulfaquinoxaline choline

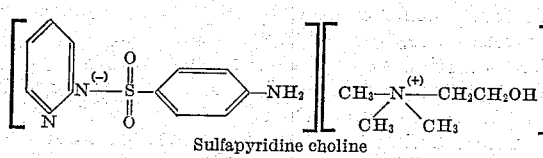
Sulfapyridine choline

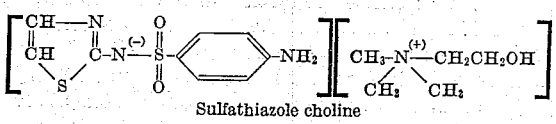
Sulfathiazole choline

The following examples illustrate a method of carrying out the present invention, but it is to be understood that these examples are given by way of illustration and not of limitation.

*Example 1*

Three hundred grams of sulfaquinoxaline (1 mole) was dissolved in 248 g. of a 48.9% aqueous solution of choline (1 mole). The dark red-brown solution was filtered into a glass distilling pot and mixed with an equal volume of benzene. The solvents were removed by vacuum distillation. The glassy solid residue was dissolved by stirring with two liters of boiling 2BA ethanol. On cooling, the sulfaquinoxaline choline crystallized and was removed by filtration. A second crop of crystals was obtained by concentrating the mother liquor on a water-bath to 50% of its volume and recooling. The product was dried at room temperature in vacuo overnight and then at 100° C. in vacuo for 6 additional hours. Yield=370 g. or 88% of theory.

A small sample of the above product was recrystallized from 2BA ethanol and dried at 100° C. and 25 mm. pressure; this material was used to obtain the following data:

| Analysis | Theory | Found |
|---|---|---|
| | percent | percent |
| Carbon | 56.58 | 56.88 |
| Hydrogen | 6.25 | 6.11 |
| Nitrogen | 17.37 | 17.46 |

M. P. 152.0–154.5° C. (corr.).
pH of aqueous solution containing 1% sulfaquinoxaline=8.55.
Solubility: 1 g. dissolves in 3 cc. cold water.

*Example 2*

30.4 g. (0.1 mole) of sulfathiazole was dissolved in 24.7 g. (0.1 mole) of a 48.9% aqueous choline solution, and to this solution 50 cc. absolute ethanol was added, followed by 50 cc. absolute ether. The choline salt of sulfathiazole crystallized from the solution on standing overnight in the icebox. Yield: 38.3 g. (90%).

This product was recrystallized from a 3:1 mixture of methanol-ethanol and dried overnight at 100° C.

| Analysis | Theory | Found |
|---|---|---|
| | percent | percent |
| Carbon | 46.91 | 47.80 |
| Hydrogen | 6.19 | 5.98 |
| Nitrogen | 15.63 | 15.98 |

M. P. 166.9–168.0° C. (Corrected).
pH of a 5% solution in water: 9.95.
Solubility: 1 gram dissolves in 1.5 cc. cold water.

*Example 3*

24.9 g. sulfapyridine (0.1 mole) was dissolved in 24.7 g. (0.1 mole) of a 48.9% aqueous choline solution and the solution was diluted with 50 cc. absolute ethanol. Upon addition of 50 cc. ether, the crystalline choline salt of sulfapyridine precipitated from the solution after standing overnight in the icebox. Yield: 32.7 g. (88%).

The product was recrystallized from methanol and dried overnight at 100° C.

| Analysis | Theory | Found |
|---|---|---|
| | percent | percent |
| Carbon | 54.55 | 54.91 |
| Hydrogen | 6.87 | 6.36 |
| Nitrogen | 15.93 | 15.97 |

Melting point: 185.0–187.5° C. (Corrected).
pH of 5% solution in water: 10.50.
Solubility: 1 gram dissolves in 2 cc. cold water.

Modifications may be made in carrying out the present invention without departing from the spirit and scope thereof, and the invention is to be limited only by the appended claims.

I claim:
1. The process for preparing a water soluble reaction product which comprises reacting choline with a sulfonamide from the group consisting of sulfaquinoxaline, sulfapyridine and sulfathiazole.

2. The process for the preparation of a water soluble reaction product of choline and sulfaquinoxaline which comprises reacting one molecular equivalent of sulfaquinoxaline with one molecular equivalent of choline in an aqueous medium and isolating the resulting reaction product in crystalline form.

3. The process for the preparation of a water soluble reaction product of choline and sulfaquinoxaline which comprises dissolving one molecular equivalent of sulfaquinoxaline in an aqueous solution of one molecular equivalent of choline, adding an organic solvent to the reaction mixture to form an azeotropic mixture, distilling off the solvents and isolating the resulting product in a crystalline form.

4. The process for the preparation of a water soluble reaction product of sulfathiazole and choline which comprises reacting one molecular equivalent of sulfathiazole with an aqueous solution of one molecular equivalent of choline, adding an aliphatic alcohol to the reaction mixture and isolating the resulting reaction product by the addition of ether.

5. The process for the preparation of a water soluble reaction product of sulfapyridine and choline which comprises reacting one molecular equivalent of sulfapyridine with an aqueous solution of one molecular equivalent of choline, adding an aliphatic alcohol to the reaction mixture and isolating the resulting reaction product by the addition of ether.

6. A sulfonamide choline from the group consisting of sulfaquinoxaline choline, sulfapyridine choline and sulfathiazole choline.

7. Sulfaquinoxaline choline having the formula:

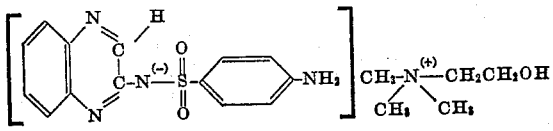

8. Sulfapyridine choline having the formula:

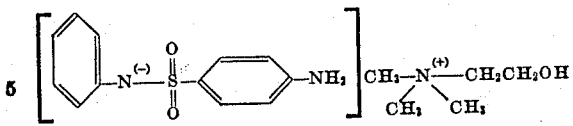

9. Sulfathiazole choline having the formula:

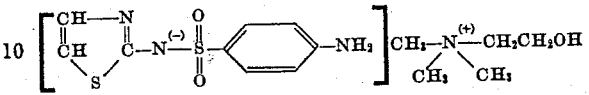

WALTER C. GAKENHEIMER.

REFERENCES CITED

The following references are of record in the file of this patent:

UNITED STATES PATENTS

| Number | Name | Date |
| --- | --- | --- |
| 2,133,787 | Northey | Oct. 18, 1938 |
| 2,186,773 | Stuart | Jan. 9, 1940 |
| 2,389,582 | Winnek et al. | Nov. 20, 1945 |
| 2,480,532 | Winnek et al. | Aug. 30, 1949 |

FOREIGN PATENTS

| Number | Country | Date |
| --- | --- | --- |
| 198,137 | Switzerland | June 15, 1938 |
| 831,300 | France | Aug. 29, 1938 |
| 839,315 | France | Mar. 31, 1939 |
| 506,431 | Great Britain | May 30, 1939 |

OTHER REFERENCES

Torda et al.: Amer. Jour. Physiology, vol 145 (1946), pp. 608–614.